(12) United States Patent
Scuncio

(10) Patent No.: US 12,470,492 B2
(45) Date of Patent: Nov. 11, 2025

(54) DATA COMMUNICATION WITH TRANSMISSION RATE ADJUSTMENT

(71) Applicant: Help/Systems, LLC, Eden Prairie, MN (US)

(72) Inventor: John Stephen Scuncio, Gloucester (CA)

(73) Assignee: Fortra, LLC, Eden Prairie, MN (US)

( * ) Notice: Subject to any disclaimer, the term of this patent is extended or adjusted under 35 U.S.C. 154(b) by 298 days.

(21) Appl. No.: 17/944,402

(22) Filed: Sep. 14, 2022

(65) Prior Publication Data

US 2024/0098031 A1    Mar. 21, 2024

(51) Int. Cl.
*H04L 47/25* (2022.01)
(52) U.S. Cl.
CPC .................... *H04L 47/25* (2013.01)
(58) Field of Classification Search
CPC ...................................... H04L 47/25
USPC ....................................... 709/238
See application file for complete search history.

(56) References Cited

U.S. PATENT DOCUMENTS

| | | | |
|---|---|---|---|
| 8,761,014 B1* | 6/2014 | Carson | H04L 63/126 370/234 |
| 9,043,486 B2 | 5/2015 | Bailey | |
| 10,063,489 B2 | 8/2018 | Snellman et al. | |
| 10,263,894 B2 | 4/2019 | Lopez Serrano et al. | |
| 2005/0232265 A1* | 10/2005 | Cheng | H04L 49/90 370/389 |
| 2006/0146875 A1 | 7/2006 | Yang | |
| 2007/0206947 A1* | 9/2007 | Natarajan | H04J 14/0227 398/25 |
| 2013/0028092 A1* | 1/2013 | Tong | H04L 47/26 370/236 |
| 2015/0067137 A1 | 3/2015 | Versteeg et al. | |
| 2016/0205026 A1* | 7/2016 | Zhovnirnovsky | H04L 47/32 370/235 |
| 2022/0255872 A1* | 8/2022 | Srinivasan | H04L 47/266 |

FOREIGN PATENT DOCUMENTS

JP  2008160302 A  *  7/2008
WO  2007/049165 A2    5/2007

OTHER PUBLICATIONS

The Hauge, Application No. 23194938.9, Extended European Search Report, mailed Jan. 12, 2024, Christiane Kesting (9 pages).

* cited by examiner

*Primary Examiner* — Ario Etienne
*Assistant Examiner* — Kidest Mendaye
(74) *Attorney, Agent, or Firm* — Crawford Maunu PLLC

(57) ABSTRACT

Aspects of the disclosure are directed to data communication with transmission rate adjustment. As may be implemented in accordance with one or more embodiments herein, such aspects may involve comparing the transmission rate at which packets are communicated from a transmitter, with a reception rate at which the packets are received at a receiver. The transmission rate at which further packets are communicated from the transmitter is adjusted in response to and/or otherwise based on the comparison.

30 Claims, 5 Drawing Sheets

DATA COMMUNICATION WITH TRANSMISSION RATE ADJUSTMENT

BACKGROUND

Data communications over networks is susceptible to various delays and quality issues, particularly as the volume of data communicated continues to grow tremendously. For instance, many communications approaches utilize buffers to store and buffer data being communicated to various endpoints. While buffers can be useful for facilitating data transmission, they may be susceptible to bloat (filling with data). For many communications, such as video streaming communications in which lack of data reception is particularly important, retransmission may be requested when data is delayed in a buffer. Further, where certain data is assigned a higher priority, lower-priority data may remain in a buffer.

Detecting issues such as buffer bloat may also be challenging. For instance, higher priority data may be processed at an acceptable speed while buffers are loaded with lower priority data, for example data using a protocol that may not be preferred.

These and other matters have presented challenges to data communication, for a variety of applications.

SUMMARY

Various example embodiments are directed to data communication systems and methods, their application and manufacture of such systems. Such embodiments may be useful for detecting and responding to data throughput issues, such as those that may be attributed to buffer bloat.

As may be implemented in accordance with one or more embodiments, for packets communicated from a transmitter at transmission rate, comparing the transmission rate with a reception rate at which the packets are received at a receiver. In response to the comparison, the transmission rate at which further packets are communicated from the transmitter is adjusted.

Another embodiment is directed to an apparatus comprising communications circuitry and control circuitry. The communication circuitry is configured to compare a transmission rate at which packets are transmitted from a transmitter with a reception rate at which the packets are received at a receiver. The control circuitry is configured to adjust, in response to the comparison, the transmission rate at which further packets are communicated from the transmitter.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which.

Figure 1:
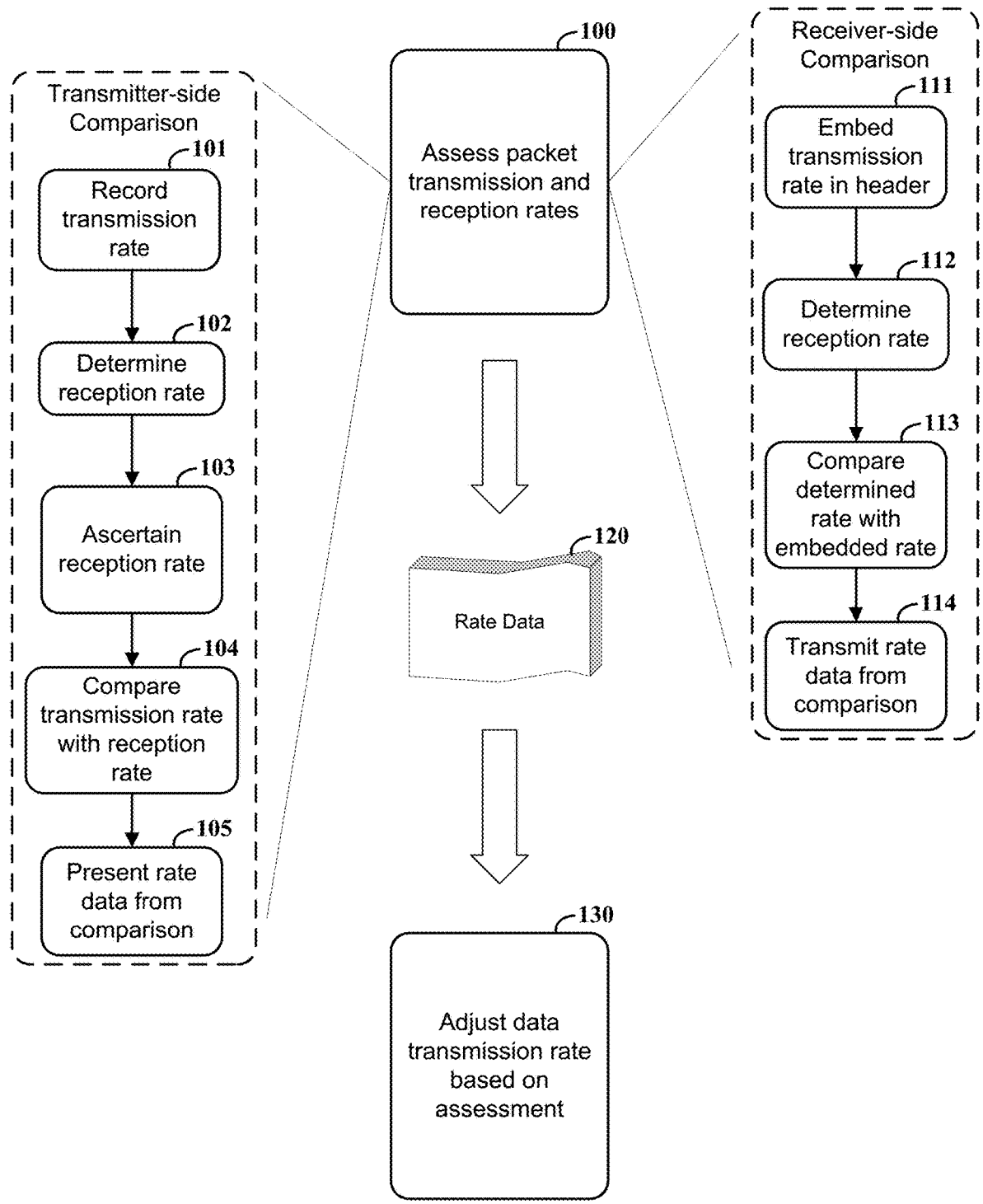
FIG. 1 shows an approach for communicating data with transmission rate adjustment, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving data transmission with transmission rate control, as may be utilized to address problems such as those noted above. For instance, the rate at which data is transmitted may be controlled based on rates at which data is being transmitted and corresponding rates at which the data being transmitted is received. Such an approach may provide an indication of buffer bloat, which can be used to adjust transmission rate. In certain implementations, aspects of the present disclosure have been shown to be beneficial when used in the context of detecting buffer bloat involving the streaming of video data in a manner that utilizes communication paths including buffers susceptible to bloat. While not necessarily so limited, various aspects may be appreciated through a discussion of examples using such exemplary contexts.

The transmission and reception rates may be compared using a variety of approaches. In some implementations, the transmission rate (e.g., speed) of data being transmitted may be embedded in a packet header of data being transmitted. A receiver may then access the transmission rate from the header and compare that to the reception rate/speed at which the data is received. In other implementations, a receiver may transmit data indicative of a rate/speed at which packets are received, which can then be compared with a transmission rate known from a transmitter. This comparison may be carried out at the transmitter, where the receiver communicates the rate/speed at which packets are received to the transmitter. This comparison may be carried out at a remote node, for instance, where the transmitter transmits the transmission rate to the remote node, and the receiver transmits the reception rate to the external node as well. In these or other instances, the comparison of transmission and reception speed/rate can be used to provide an indication of buffer bloat.

Various actions may be carried out upon detection of buffer float. For instance, when the reception rate is determined to be slower than the transmission rate, the transmission rate may be slowed. Where the receiver or a remote node carries out the comparison, a message can be sent to the transmitter, controlling the transmitter to slow its transmission rate. Where the transmitter does the comparison (e.g., utilizing a reception rate communicated by a receiver), the transmitter may operate to slow its own transmission rate. This slowing may allow buffers to catch up.

Accordingly, when the detected reception rate starts to approach the transmission rate, the comparison of rates may indicate that buffers are operating within capacity. In such instances, the transmission rate may thus be increased.

Similar to the above, where the receiver or a remote node is carrying out the comparison, a communication such as an instruction may be sent to the transmitter to increase the transmission rate. Where the transmitter carries out the comparison using a reception rate provided by the receiver, the transmitter may increase its own transmission rate.

Certain specific embodiments may be useful with a UDP transfer protocol, with buffer bloat detection carried out based on a comparison of rates at which packets are transmitted and received. Such an approach may be implemented in a communication scheme in which UDP (User Datagram Protocol) packets may not have priority and may be dropped in preference to other packets such as those utilizing TCP (Transmission Control Protocol). For instance, where a stack is utilized for UDP, most recent packets may be used in a first-in, last-out (FILO) scenario as old packets may not be useful (e.g., for video streaming where video displayed at an endpoint has already progressed beyond a time to which the old packets pertain). UDP packets may thus skip along the tops of the stacks and process quickly, however underlying buffers may be full such the speed of such UDP packets may not provide a desirable measure of congestion. Accordingly, tracking a rate at which packets are sent and received as characterized herein, may be used to identify the state of the buffers, for example where an older packet is finally released from a buffer.

In a particular application, measuring the rate at which packets are received allows for near instantaneous bloat detection and aggressive response, which may be carried out in the form of a binary search reduction to correct for bloat. Bandwidth may be advanced using a short-term history to seek a higher bandwidth along a sigmoid curve to allow network adjustment to changing rates. Such an approach may be referred to as binary search bandwidth retreat and sigmoid advancement on short-term history congestion control. This approach may be carried out at a receiver, in which the sender speed is embedded in the header of data packets, or may be carried out at a transmitter (or remote node) utilizing a reception rate determined by such a receiver.

The rate at which packets are received may be recorded as a short-term rolling average along with the time since receiving a previous packet, giving the destination an accurate recorded receive rate, also in a rolling average. Once at least two packets have arrived at their destination, the packet bloat between the source and destination can be known by calculating the delta between the reported and recorded rates. For instance, a reported reception rate may be added to rolling averages that give a short-term history of bloat associated with those values. These recorded histories may provide a target when it is determined that the transmission rate should be increased. The history may initially be populated by attempting to hit a target rate determined at the start of the transfer.

Accordingly, the "delta" as a time difference between the reception of respective packets can be used to determine a new adjusted rate that can be generated at or sent to the source with a rate control packet. The magnitude of the adjustment may be defined by a configured aggression (e.g., from 1 to 10, 1 being the least aggressive, 10 being the most). Higher aggression values may be used to generate a more rapid increase in speed, and a more gradual decrease in speed.

The determined magnitude or amount of packet bloat may be utilized to determine whether to increase, decrease or maintain data transmission rates. For instance, if the bloat magnitude is not changing, an incoming rate can be utilized with no adjustment. The choice to not change may be determined by an aggression value, where one would have the lowest allowable bloat and 10 would have the highest.

If bloat magnitude exceeds a threshold (e.g., where aggression 1 has the lowest allowable bloat, and 10 the highest), a factor by which the transmission rate is decreased is determined by a current delta between recorded and reported rates. For instance, the transmission rate may be decreased to 75% of a determined delta at aggression 1, and 25% of the delta at aggression 10. These values may advance in a linear manner between 1 and 10.

If bloat magnitude is below a given threshold supplied by the aggression, the transmission rate can be increased, for instance to a target rate determined by short term history, an historic max, or an initial target in a given order of priority. The number of steps to reach that target may be determined by an aggression value and a current transmission rate. The advancement may be carried out according to a defined aggression, for instance for implementation over a full second for an aggression value of 1, and over 100 ms for an aggression value of 10.

According to a particular embodiment, the transmission rate and the reception rate of data are compared, in response to which the transmission rate is adjusted. For instance, the transmission rate of packets communicated/transmitted from a transmitter may be compared with a reception rate at which the packets are received at a receiver (e.g., as measured at the receiver). The reception rate may be determined based on time elapsed between the receipt of successive packets. The transmission rate at which further packets are communicated from the transmitter may thus be adjusted in response thereto. For instance, the transmission rate may be adjusted by a value corresponding to a deviation of the reception rate relative to the transmission rate.

The comparison and adjustment of transmission rate may be carried out at one or both of a transmitter and receiver. In a particular embodiment, comparing the transmission rate with the reception rate includes using speed data embedded in the packets, in which the speed data is indicative of a transmission rate at which packets are to be transmitted.

Speed data may be actively embedded, for instance into the packets (e.g., in packet headers) being communicated from the transmitter. This speed data may be indicative of the transmission rate, and the embedded speed data may be compared with the reception rate at the receiver (e.g., using circuitry within the receiver). Further, data may be transmitted by the receiver based on the comparing, and may be used to adjust the transmission rate at which the further packets are communicated. For instance, the receiver may transmit a control input that causes the transmitter to adjust its transmission rate.

In some instances, data indicative of the reception rate at the receiver may be transmitted to the transmitter, at which the steps of comparing the transmission rate with a reception rate and adjusting the transmission rate are carried out. In other instances, a message is communicated to the transmitter, directing the transmitter to reduce the transmission rate in response to the reception rate being lower than the transmission rate (e.g., with the comparison taking place remote from the transmitter, such as at the receiver or at another remote location/circuit).

Various embodiments are directed to mitigating buffer bloat. For instance, buffer bloat may be detected in a communications buffer via which the packets are communicated, based on the comparison. The rate at which the packets are to be transmitted may be adjusted in response thereto. Adjusting the transmission rate in this regard may include predicting increases in the buffer bloat based on changes in the reception rate, with the transmission rate of the packets being reduced in response to a prediction of the buffer bloat exceeding a threshold. Where decreases in the buffer bloat below a threshold are predicted based on changes in the reception rate, the transmission rate of the packets may be increased.

Speed data may be embedded in the packets to facilitate buffer bloat. For instance, detecting the buffer bloat may include detecting the reception rate at the receiver and comparing the detected reception rate with the embedded speed data.

Data indicative of the reception rate may be transmitted from the receiver to the transmitter. The buffer bloat may thus be detected at the transmitter, by comparing the transmitted data (from the receiver and indicative of the reception rate) with the transmission rate.

Various embodiments are directed to apparatuses as may implement various approaches characterized herein. Such apparatuses may include a variety of circuitry, for example as programmed to execute instructions to carry out various functions to achieve the embodiments characterized herein. A particular embodiment is directed to an apparatus comprising communications circuitry and control circuitry, in which the communication circuitry compares a transmission rate at which packets are transmitted from a transmitter with a reception rate at which the packets are received at a receiver. The control circuitry adjusts the transmission rate at which further packets are communicated from the transmitter in response to the comparison (e.g., by a value corresponding to a deviation of the reception rate relative to the transmission rate). The communications circuitry may compare the transmission rate with the reception rate using speed data embedded in the packets and indicative of a transmission rate at which packets are to be transmitted. In some implementations, the control circuitry adjusts the transmission rate by communicating a message directing the transmitter to reduce the transmission rate in response to the reception rate being lower than the transmission rate. The apparatus may include the transmitter, the receiver, or both. One or both of the transmitter and receiver may include a portion of communications circuitry, the control circuitry, or a combination thereof.

Where the apparatus includes the transmitter, the transmitter may embed speed data into the packets being communicated therefrom. Such speed data may be indicative of the transmission rate, where the communications circuitry is configured to compare the transmission rate by comparing the embedded speed data with the reception rate at the receiver.

Where the apparatus includes the receiver, the receiver may ascertain the reception rate at which the packets are received and transmit data based on the comparing. The control circuitry may operate with the transmitter to use the data transmitted by the receiver to adjust the transmission rate at which the further packets are communicated from the transmitter. For instance, the receiver may transmit a control input that causes the transmitter to adjust the transmission rate.

Where the apparatus includes the transmitter and receiver, the transmitter may include some or all of the communications circuitry and the control circuitry. The receiver may transmit data indicative of the reception rate to the transmitter, with transmitter operable to compare the transmission rate with the data indicative of the reception rate and adjust the transmission rate in response to the comparison.

The control circuitry may operate in a variety of manners. In some implementations, the control circuitry may detect buffer bloat in a communications buffer via which the packets are communicated based on the comparison, and adjust the rate at which the transmitter transmits packets in response. For instance, the control circuitry may predict increases in the buffer bloat based on changes in the reception rate, and reduce the transmission rate of the packets in response to the buffer bloat being predicted to exceed a threshold. The control circuitry may predict decreases in the buffer bloat based on changes in the reception rate, and increase the transmission rate of the packets in response to the buffer bloat being predicted to decrease below a threshold. Where the apparatus includes the transmitter and the transmitter embeds speed data in the packets, the control circuitry may detect buffer bloat by detecting the reception rate at the receiver and comparing the detected reception rate with the embedded speed data. Where the apparatus includes the receiver and the receiver transmits data indicative of the reception rate to the transmitter, the control circuitry (e.g., as may be embedded in the transmitter) may detect buffer bloat by comparing the transmitted data with the transmission rate indicated by the data indicative of the reception rate as received at the transmitter.

Turning now to the figures, FIG. 1 shows a flow diagram and approach for data communications with transmission rate adjustment based on buffer bloat, as may be implemented in accordance with one or more embodiments. At block 100, packet transmission and reception rates are assessed, such as by comparison or other processing, and rate data 120 is generated based on the assessment. This rate data is used to adjust a data (e.g., packet) transmission rate at block 130. These processing operations may be carried out in processing circuitry at a transmitter, at a receiver, at a location remote from the transmitter and receiver, or at a combination thereof.

In certain embodiments, operations for assessing packet transmission and reception rates may be carried out at a transmitter side as follows. A data transmission rate is recorded or otherwise obtained at block 101, and a reception rate of the data is determined at block 102. For instance, the reception rate may be transmitted from a receiver to the transmitter side. The reception rate may be received at block 103, for instance as transmitted by a receiver detecting the reception rate. At block 104, the transmission rate is compared with the reception rate, and rate data from the comparison (120) is presented at block 105. These operations may be carried out within transmitter circuitry, in which instance the operation at block 103 may be omitted. The rate data may be used at block 130 to adjust a data transmission rate.

One or more embodiments may involve carrying out operations for assessing packet transmission and reception at a receiver side as follows, some or all of which may be integrated with operations carried out on the transmitter side as noted above, or otherwise. A transmission rate may be embedded in a header of packets to be transmitted at block 111, and a rate at which the packets are received may be determined at block 112. At block 113, the transmission rate, as received via the header, may be compared with the detected reception rate. At block 114, rate data 120 from the comparison may be transmitted for use at a remote location or a transmitter, to adjust data transmission rate as depicted at block 130. In some instances, the rate data 120 is used at a receiver to determine an adjusted transmission rate, and an instruction may be sent to a transmitter for effecting the adjustment.

Figure 2:
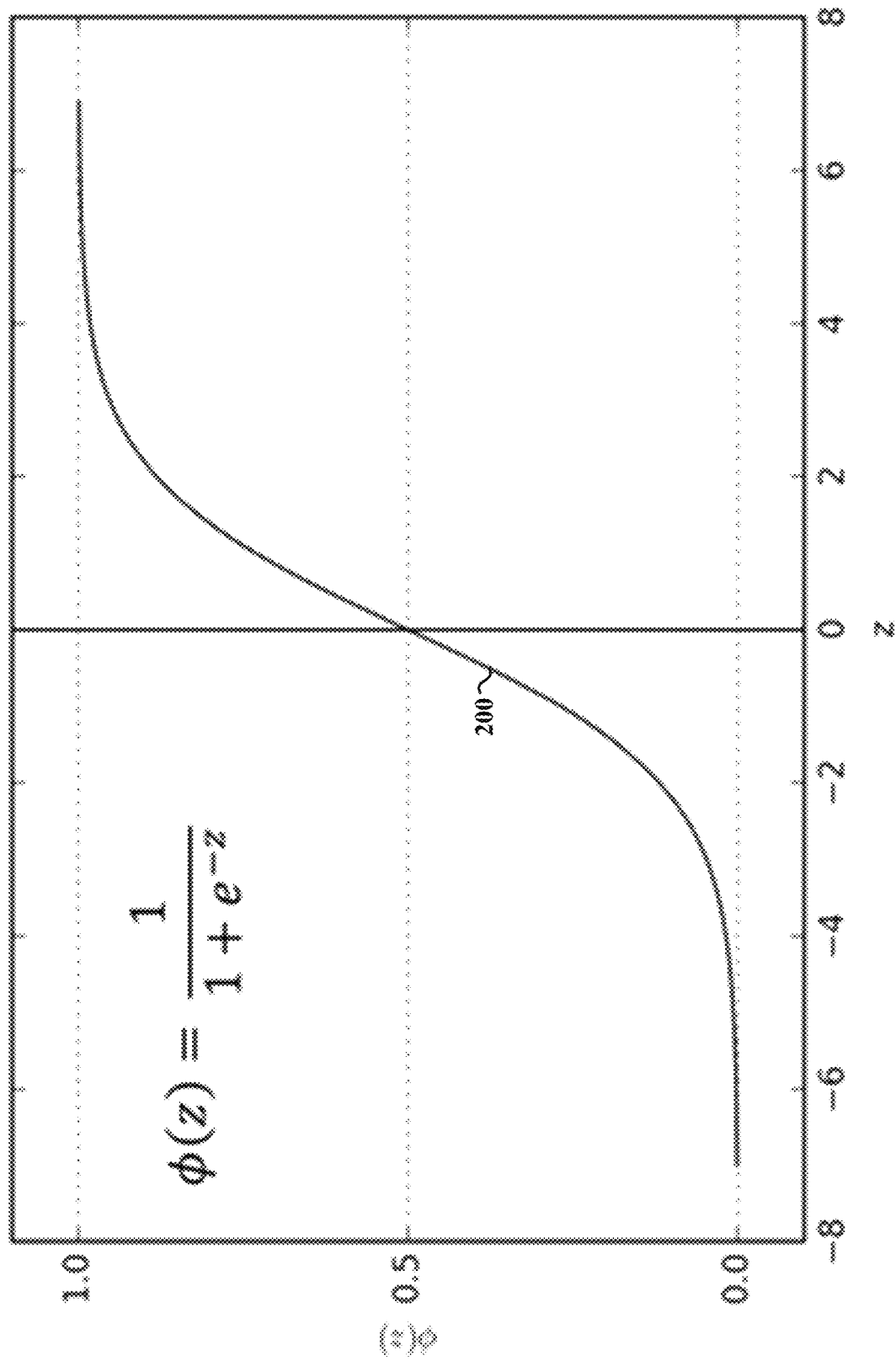
FIG. 2 shows a plot depicting a sigmoid function as may be implemented in accordance with various embodiments.

FIG. 2 shows a plot 200 depicting a sigmoid function as may be implemented in accordance with various embodiments. The advancement path for adjusting data transmission rates may be determined by a Sigmoid function between 0 and 1, in accordance with plot 200. Such an approach may facilitate a gradual increase in speed. If slowdowns are not encountered, a rapid increase in speed can be carried out. In certain applications using such an approach, a target transmission rate may be achieved over a course of time ranging from 100 ms to 1 second. If buffer bloat exceeds a threshold during such a speed increase, the advancement may be adjusted such as by reducing speed, maintaining speed prior to further increases, or cancelling any increase.

Figure 3A:
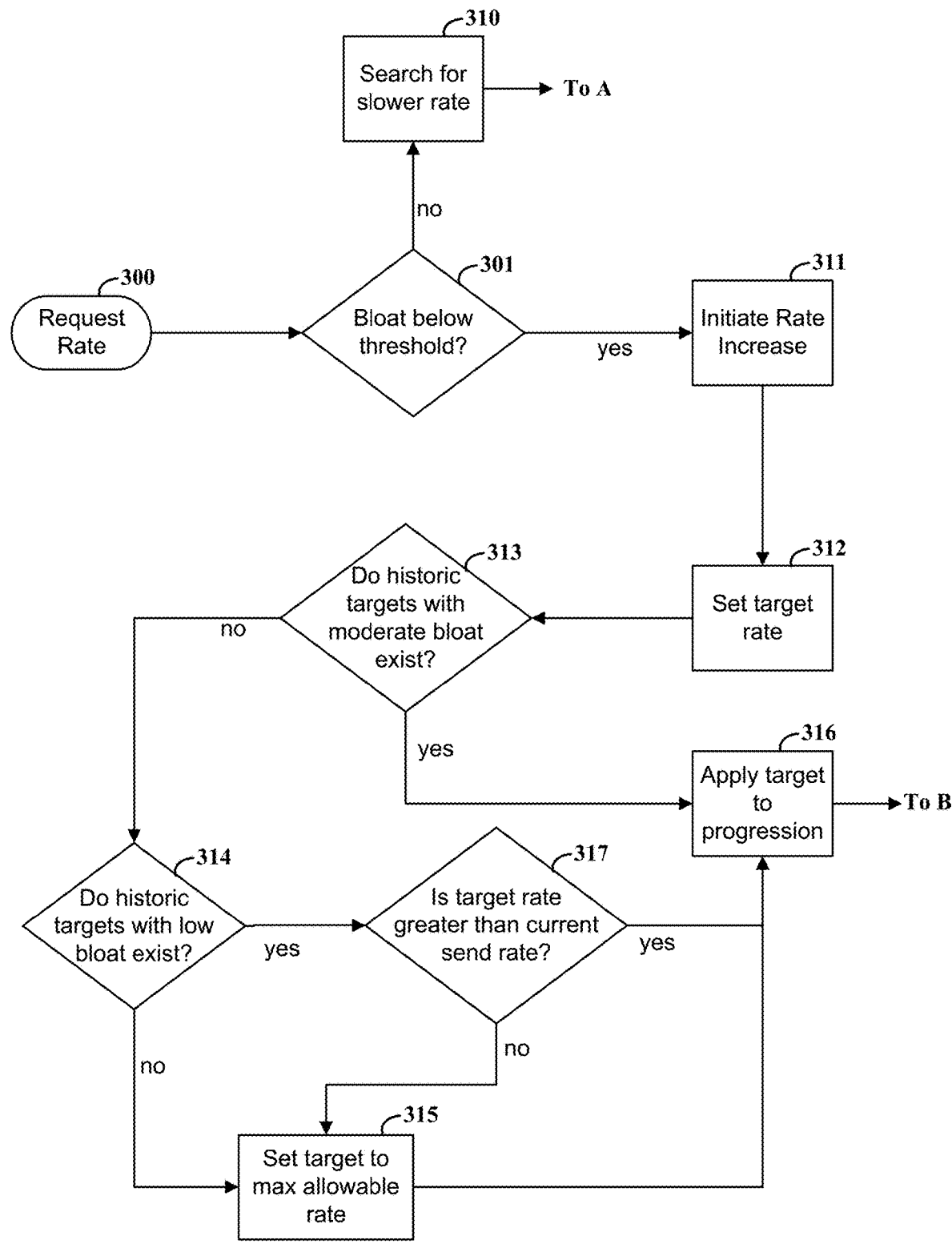
FIG. 3A and FIG. 3B depict respective portions of a data flow diagram for an approach to communicating data with transmission rate adjustment, in accordance with one or more embodiments.
Figure 3B:
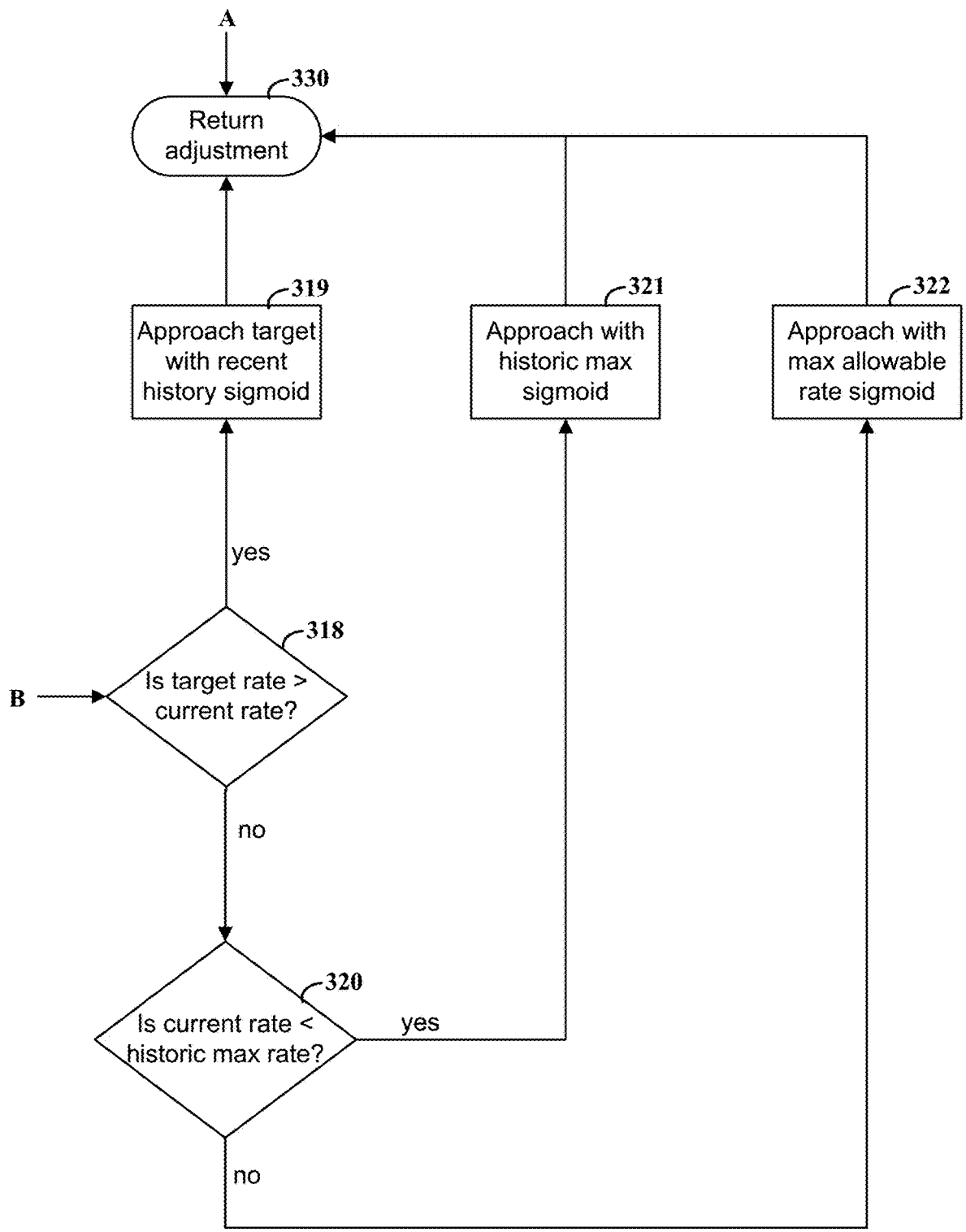

FIGS. 3A and 3B depict respective portions of a data flow diagram for an approach to communicating data with transmission rate adjustment, in accordance with one or more embodiments. When a rate is requested at 300 as shown in FIG. 3A, if buffer bloat is not below a threshold at 301, a search (e.g., binary) is carried out for a lower rate at 310 and an adjustment to the rate is returned at 330 (see "A" in FIG. 3B). If buffer bloat is below a threshold at 301, a rate increase may be desirable and a rate increase may be initiated at 311. A target rate may be set at block 312.

If historic targets with moderate and low bloat do not exist (313, 314), the target may be set to a maximum allowable rate at block 315. This maximum target value may be applied to a rate increase progression at 316.

If historic targets with moderate bloat do not exist at 313 but such historic targets with low bloat do exist at 314, and if the target rate is not greater than the current send/transmission rate at 317, the target may also be set to the maximum allowable rate at block 315 and applied to a progression at 316. If the target rate is greater than the current send/transmission rate at 317, that target is applied to the rate increase progression at 316.

If historic targets with moderate bloat do exist at 313, the target may be applied directly to the rate increase progression at 316. The values for moderate or low bloat may be set to suit particular applications.

Once the target being applied to the progression at 316, the process may continue at B (FIG. 3B). If the target rate is greater than the current rate at 318, increases in the transmission rate are controlled at block 319 in which a recent history sigmoid is used to apply such increases to approach the target rate.

If the target rate is not greater than the current rate at 318 and the current rate is less than a historical maximum rate at 320, transmission rate increases are generated at block 321 to approach the target, using a sigmoid corresponding to the historical maximum rate. If the target rate is not greater than the current rate at 318 and is not less than the historical maximum rate at 320, transmission rate increases are generated at block 322 to approach the target using a sigmoid corresponding to a maximum allowable rate. All rate increases may thus be applied at 330, with an adjustment returned (e.g., to transmission circuitry).

The comparisons noted in FIGS. 3A and 3B, as well as otherwise herein, may be modified from that shown and described, while also keeping the context of the noted operations. For instance, when discussing whether a target is greater or less than a particular rate, or when bloat is above, below or at a threshold, such embodiments may be implemented where a value is greater or equal to a threshold, less than or equal to a threshold, etc. Such changes follow the noted scope.

Figure 4:
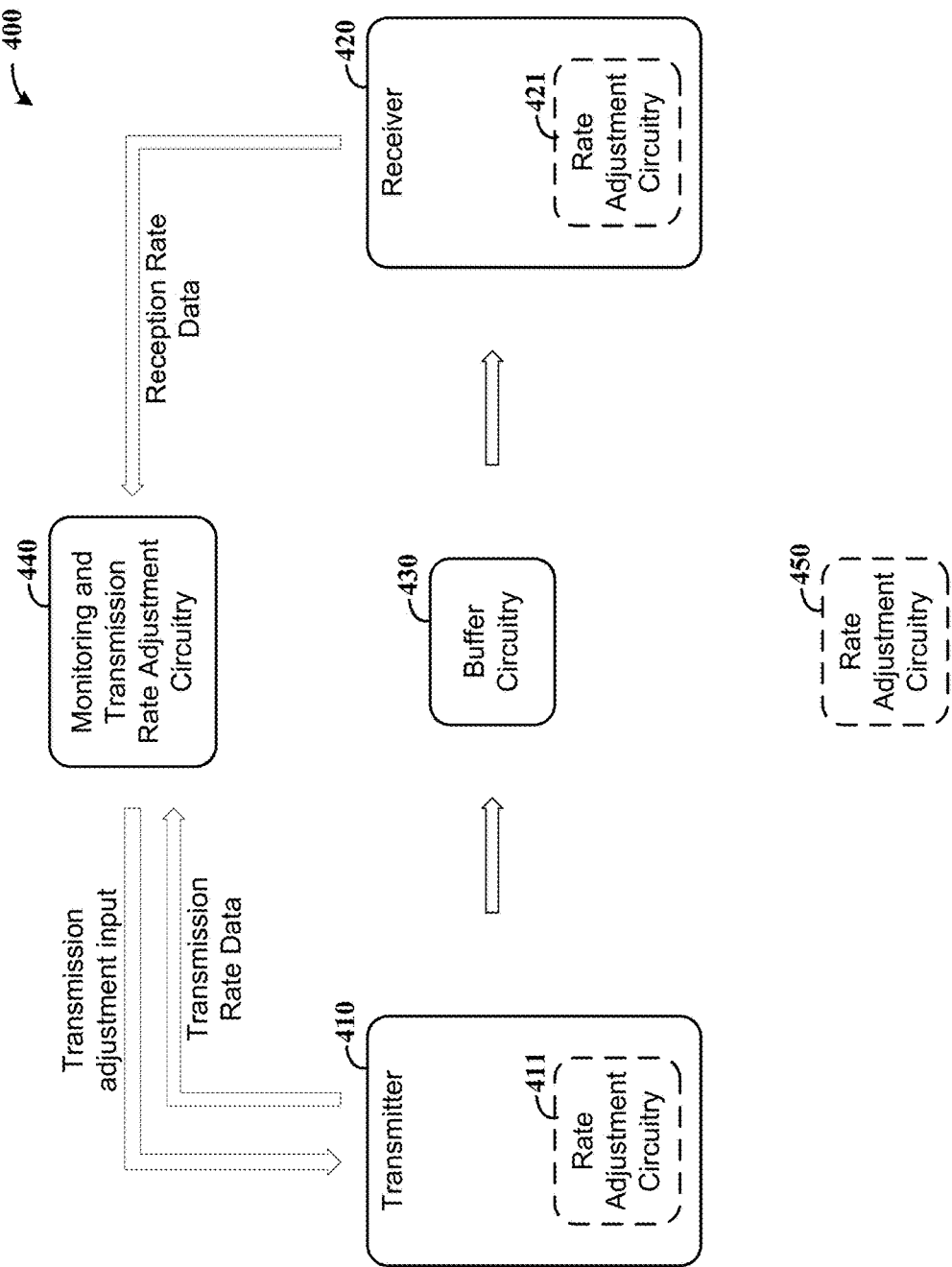
FIG. 4 shows a data transmission system to operate with transmission rate adjustment, in accordance with one or more embodiments.

FIG. 4 shows a data transmission system 400, which operates with transmission rate adjustment, in accordance with one or more embodiments. The various components as shown may be implemented together in certain embodiments, while other embodiments are directed to implementation of fewer than all, or one, of the noted components. The system 400 depicts a transmitter 410, a receiver 420, and buffer circuitry 430 that operates to buffer data transmitted from the transmitter to the receiver. The system 400 may further include rate adjustment circuitry, implemented as one or more of circuits 411, 421 and 450 respectively in the transmitter, receiver and at a location remote from the transmitter and receiver. Monitoring and rate adjustment circuitry 440 operates to provide monitoring of transmission aspects (e.g., as may pertain to buffer bloat), and to provide an output that controls a rate at which the transmitter 410 transmits data.

The monitoring and transmission rate adjustment circuitry 440 can be located remotely from the transmitter 410 and receiver 420, within the transmitter, or within the receiver. Furthermore, the monitoring and transmission rate adjustment circuitry 440 may include circuit components in different locations, such as within one or more of a remote location as shown, the transmitter 410 and the receiver 420 (e.g., and communicatively coupled to one another). In certain contexts, the monitoring and transmission rate adjustment circuitry 440 may include one or more of rate adjustment circuitry 411, 421 and 450, where such circuitry is implemented.

The system 400 may be operated using one or more approaches as characterized in the other figures. For instance, aspects of the transmitter-side comparison shown in FIG. 1 may be carried out within the rate adjustment circuitry 411, and aspects of the receiver-side comparison in FIG. 1 may be carried out within the rate adjustment circuitry 421. The comparison carried out in block 100 of FIG. 1, as well as the adjustment carried out at block 120, may be implemented in connection with the monitoring and transmission rate adjustment circuitry 440. Similarly, some or all of the various approaches to monitoring and adjusting transmission rates as depicted in FIGS. 3A and 3B may be implemented with one or more of the monitoring and transmission rate adjustment circuitry 440 and rate adjustment circuits 411, 421 and/or 450.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., assessing reception and transmission rates, or applying a sigmoid function). For example, in certain of the above-discussed embodiments, one or more modules are discrete logic circuits or programmable logic circuits configured and arranged for implementing these operations/activities, as in the circuit modules shown in FIG. 4. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, different thresholds can be set for respective rate control functions, and fewer or more such thresholds may be utilized. Such modifications do not depart from the true spirit and scope of various aspects of the invention, including aspects set forth in the claims.

What is claimed is:

1. A method comprising:
embedding speed data into packets being communicated from a transmitter, the speed data in each packet including a transmission rate at which the packet is transmitted, and transmitting the packets from the transmitter;
comparing the transmission rate in the embedded speed data for each packet with a reception rate at which the packet is received at a receiver;
in response to the comparison, adjusting the transmission rate at which further ones of the packets are communicated from the transmitter;
wherein adjusting the transmission rate includes setting a target rate and initiating a rate increase in response to the comparison indicating a buffer bloat is below a threshold,
applying the target rate based on a presence of historical targets at which the buffer bloat was moderate;
in response to the presence of historical targets at which buffer bloat was lower than the moderate bloat, and absence of historical targets with the moderate bloat, applying the target rate in response to the target rate being greater than the current rate;
in response to the presence of historical targets having low bloat and the absence of historical targets with moderate bloat, setting the target rate to a maximum allowable rate in response to the target rate not being greater than the current rate; and
in response to the absence of historical targets with low or moderate bloat, setting the target rate to a maximum allowable rate in response to the target rate not being greater than the current rate.

2. The method of claim 1, wherein adjusting the transmission rate includes carrying out a binary search reduction in response to the comparison indicating the buffer bloat is not below a threshold, using a short-term history to seek a higher bandwidth along a sigmoid curve.

3. The method of claim 1 further including: transmitting data, from the receiver, based on the comparing; and using the data to adjust the transmission rate at which the further packets are communicated.

4. The method of claim 3, wherein transmitting the data from the receiver includes transmitting a control input that causes the transmitter to adjust the transmission rate.

5. The method of claim 1, wherein adjusting the transmission rate further includes: in response to the target rate being greater than a current transmission rate, approaching the target rate using a recent history sigmoid; in response to the target rate not being greater than the current transmission rate and in response to the current rate being less than a historical maximum rate, approaching the target rate using a historic maximum sigmoid; and in response to the target rate not being greater than the current transmission rate and in response to the current rate not being less than the historical maximum rate, approaching the target rate using a maximum allowable rate sigmoid.

6. The method of claim 1, further including transmitting data indicative of the reception rate at the receiver to the transmitter, wherein the steps of comparing the transmission rate with a reception rate and adjusting the transmission rate are carried out at the transmitter.

7. The method of claim 1, further including measuring the reception rate at which the packets are received.

8. The method of claim 1, further including determining the reception rate based on time elapsed between the receipt of successive packets.

9. The method of claim 1, wherein adjusting the transmission rate includes communicating a message directing the transmitter to reduce the transmission rate in response to the reception rate being lower than the transmission rate.

10. The method of claim 1, wherein adjusting the transmission rate includes detecting the buffer bloat in a communications buffer via which the packets are communicated based on the comparison, and in response thereto, adjusting the rate at which the packets are to be transmitted.

11. The method of claim 10, wherein adjusting the transmission rate includes predicting increases in the buffer bloat based on changes in the reception rate, and in response to the predicting indicating the buffer bloat will exceed a threshold, reducing the transmission rate of the packets.

12. The method of claim 10, wherein adjusting the transmission rate includes predicting decreases in the buffer bloat based on changes in the reception rate, and in response to the predicting indicating the buffer bloat will decrease below a threshold, increasing the transmission rate of the packets.

13. The method of claim 10, wherein detecting the buffer bloat includes, at the receiver, detecting the reception rate and comparing the detected reception rate with the embedded speed data.

14. The method of claim 10, further including transmitting data indicative of the reception rate from the receiver to the transmitter, wherein detecting the buffer bloat includes comparing, at the transmitter, the transmitted data with the transmission rate.

15. The method of claim 1, wherein adjusting the transmission rate includes adjusting the transmission rate by a value corresponding to a deviation of the reception rate relative to the transmission rate.

16. An apparatus comprising:
a transmitter configured to embed speed data into packets communicated therefrom, the embedded speed data including a transmission rate at which the packets are transmitted;
communications circuitry to compare a transmission rate in the embedded speed data for each packet at which the packets are transmitted from the transmitter with a reception rate at which the packets are received at a receiver;
control circuitry to adjust, in response to the comparison, the transmission rate at which further ones of the packets are communicated from the transmitter, wherein adjusting the transmission rate includes setting a target rate and initiating a rate increase in response to the comparison indicating a buffer bloat is below a threshold, applying the target rate based on a presence of historical targets at which the buffer bloat was moderate;

in response to the presence of historical targets at which buffer bloat was lower than the moderate bloat, and absence of historical targets with the moderate bloat, applying the target rate in response to the target rate being greater than the current rate;

in response to the presence of historical targets having low bloat and the absence of historical targets with moderate bloat, setting the target rate to a maximum allowable rate in response to the target rate not being greater than the current rate; and in response to the absence of historical targets with low or moderate bloat, setting the target rate to a maximum allowable rate in response to the target rate not being greater than the current rate.

17. The apparatus of claim 16, wherein the control circuitry is configured to adjust the transmission rate by carrying out a binary search reduction in response to the comparison indicating the buffer bloat is not below a threshold, using a short-term history to seek a higher bandwidth along a sigmoid curve.

18. The apparatus of claim 16, including the receiver, the receiver being configured to ascertain the reception rate at which the packets are received and to transmit data based on the comparing, wherein the control circuitry is configured and arranged with the transmitter to use the data transmitted by the receiver to adjust the transmission rate at which the further packets are communicated from the transmitter.

19. The apparatus of claim 18, wherein the receiver is configured to transmit the data by transmitting a control input that causes the transmitter to adjust the transmission rate.

20. The apparatus of claim 16, including the receiver, the receiver being configured to transmit data indicative of the reception rate to the transmitter, the transmitter including the communications circuitry and the control circuitry, and the transmitter being configured to: compare the transmission rate with the data indicative of the reception rate; and adjust the transmission rate in response to the comparison.

21. The apparatus of claim 16, wherein the control circuitry is configured to adjust the transmission rate by communicating a message directing the transmitter to reduce the transmission rate in response to the reception rate being lower than the transmission rate.

22. The apparatus of claim 16, wherein the control circuitry is configured to detect the buffer bloat in a communications buffer via which the packets are communicated based on the comparison, and in response thereto, adjust the rate at which the transmitter transmits packets.

23. The apparatus of claim 22, wherein the control circuitry is configured to: predict increases in the buffer bloat based on changes in the reception rate; and in response to the predicting indicating the buffer bloat will exceed a threshold, reduce the transmission rate of the packets.

24. The apparatus of claim 22, wherein the control circuitry is configured to: predict decreases in the buffer bloat based on changes in the reception rate; and in response to the predicting indicating the buffer bloat will decrease below a threshold, increase the transmission rate of the packets.

25. The apparatus of claim 22, wherein the control circuitry is configured to detect the buffer bloat by, at the receiver, detecting the reception rate and comparing the detected reception rate with the embedded speed data.

26. The apparatus of claim 22, further including the receiver, the receiver being configured to transmit data indicative of the reception rate to the transmitter, wherein the control circuitry is in the transmitter and configured to detect the buffer bloat by comparing the transmitted data with the transmission rate indicated by the data indicative of the reception rate as received at the transmitter.

27. The apparatus of claim 16, wherein the control circuitry is configured to adjust the transmission rate by a value corresponding to a deviation of the reception rate relative to the transmission rate.

28. The apparatus of claim 16, further including the transmitter, the transmitter including at least a portion of circuitry selected from the group of the communications circuitry, the control circuitry, and a combination thereof.

29. The apparatus of claim 28, further including the receiver, the receiver including at least a portion of circuitry selected from the group of the communications circuitry, the control circuitry, and a combination thereof.

30. The apparatus of claim 16, further including the receiver, the receiver including at least a portion of circuitry selected from the group of the communications circuitry, the control circuitry, and a combination thereof.

* * * * *